United States Patent
Smith et al.

(10) Patent No.: US 7,907,309 B2
(45) Date of Patent: Mar. 15, 2011

(54) IMAGE SCANNING WITHOUT DIRECTLY DETECTING ALL COLOR CHANNEL COLOR SPACE VALUES FOR EACH IMAGE LINE

(75) Inventors: Kenneth K. Smith, Boise, ID (US); Gordon James McNutt, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1126 days.

(21) Appl. No.: 11/551,719

(22) Filed: Oct. 22, 2006

(65) Prior Publication Data

US 2008/0144133 A1   Jun. 19, 2008

(51) Int. Cl.
    *H04N 1/46* (2006.01)
(52) U.S. Cl. .................. 358/474; 348/366; 348/353
(58) Field of Classification Search .............. 358/474, 358/500; 348/266, 336, 353, 445, 489
    See application file for complete search history.

(56) References Cited

U.S. PATENT DOCUMENTS

| | | | |
|---|---|---|---|
| 6,042,013 A | 3/2000 | Fork | |
| 6,104,509 A | 8/2000 | Yoshida | |
| 6,201,596 B1 | 3/2001 | Sugita | |
| 6,542,259 B1 | 4/2003 | Andersen et al. | |
| 2005/0180649 A1* | 8/2005 | Curry et al. | 382/243 |
| 2005/0281455 A1* | 12/2005 | Huang | 382/156 |
| 2008/0303934 A1* | 12/2008 | Hiromatsu | 348/311 |

OTHER PUBLICATIONS

C. Salvaggio et al., "What is Inside a JPEG File," Society for Imaging Science and Technology web site http://www.imaging.org, printed from Internet Sep. 22, 2006.
D.A. Kerr, "Chrominance Subsampling in Digital Images," The "Pumpkin" Series of Articles, Issue 1, Nov. 2, 2005, accessed from Internet at http://doug.kerr.home.att.net/pumpkin/.
R. Hoffner, "Technology Corner: What is 4:2:2?," www.tvtechnology.com (Internet web site), Jul. 10, 2002.

* cited by examiner

*Primary Examiner* — Benny Q Tieu
*Assistant Examiner* — Marcellus Augustin (57) ABSTRACT

A scanning device includes a scanning mechanism and logic to control the scanning mechanism. A digital color representation of a hardcopy image is generated that has color channel color space values for each of a number of logical lines of the image, without all the color channel color space values being directly detected for each line of the image.

19 Claims, 5 Drawing Sheets

IMAGE SCANNING WITHOUT DIRECTLY DETECTING ALL COLOR CHANNEL COLOR SPACE VALUES FOR EACH IMAGE LINE

BACKGROUND

Scanning devices, such as standalone scanners and so-called "all-in-one" devices that include scanning as well as other functionality in one device, are used to scan digital representations of hardcopy images, frequently in color. Generally, scanning devices that can relatively quickly scan a full-color digital representation of an image employ sensors, such as charged-coupled devices (CCD), that can detect all the color channel color space values of a logical line of the image at the same time. These color channel color space values are commonly the red, green, and blue values of the red-green-blue (RGB) color space. Thus, for example, such scanning devices can detect the red, green, and blue values of a logical line of the image at the same time.

By comparison, scanning devices that more slowly scan a full-color digital representation of an image employ sensors, such as contact-image sensors (CIS), that cannot detect all the color channel color space values of a logical line of the image at the same time. For example, such scanning devices may first detect the red values of a logical line of the image, then the blue values of the logical line, and finally the green values. These types of scanning devices are typically less expensive than scanning devices that can detect all the color channel color space values of a logical line of an image at the same time. However, their slower speed may nevertheless render these types of scanning devices less than ideal for many users.

DETAILED DESCRIPTION

Figure 1:
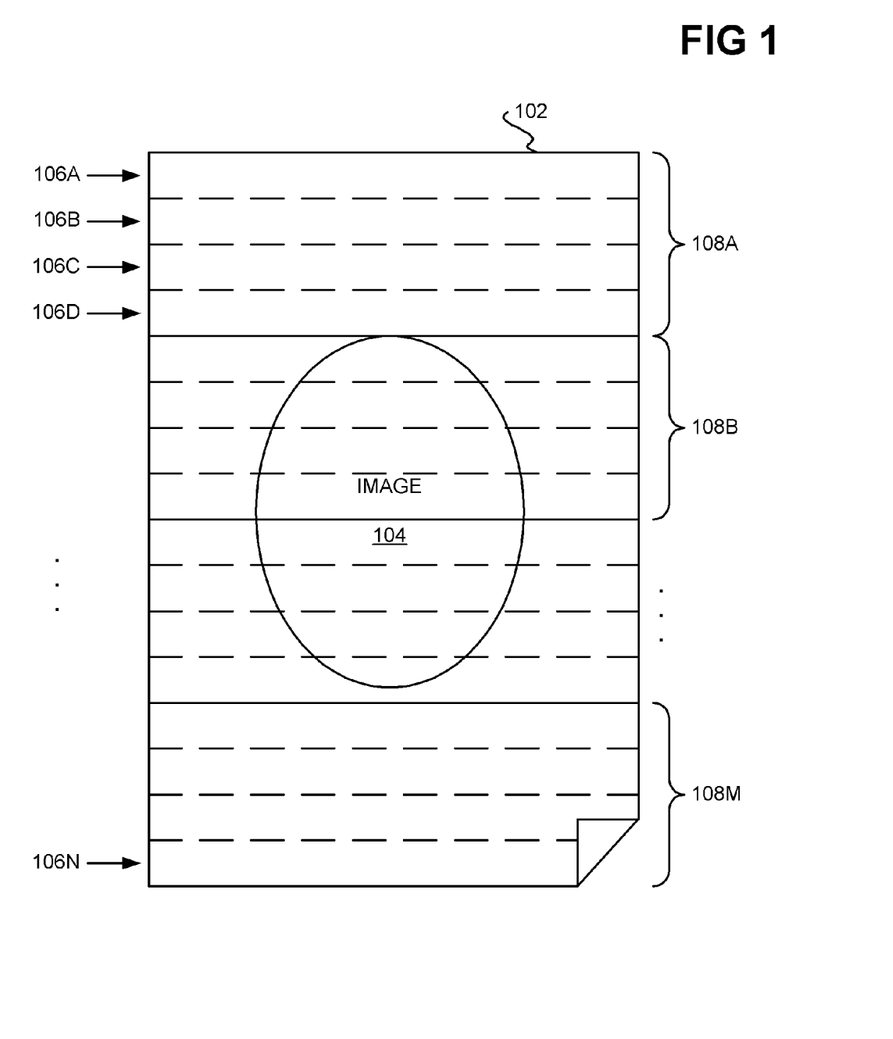
FIG. 1 is a diagram of a hardcopy image that can be scanned by a scanning device to generate a digital color representation of the image, according to an embodiment of the invention.

FIG. 1 shows a hardcopy medium 102 having an image 104 thereon, according to an embodiment of the invention. The hardcopy medium 102 may be paper, or another type of hardcopy, physical medium. The image 104 is thus a physical image printed on or otherwise on the medium 102, and therefore can be referred to as a hardcopy image. The image 104 may be color, black-and-white, or a grayscale image. The image 104 is scanned by a scanning device, in accordance with an embodiment of the invention, to yield a digital color representation of the image 104. That is, a scanning device scans the image 104 to generate data that is a digital color representation of the image 104, which may be in a JPEG or another format.

For scanning purposes, the image 104 on the hardcopy medium 102 may be considered as being logically divided into a number of logical lines 106A 106B, 106C, 106D, ..., 106N, collectively referred to as the logical lines 106. The lines 106 are logical in that they are not actually physical present on the medium 102. Rather, the lines 106 represent how the image 104 is scanned by a scanning device. For instance, each of the lines 106 may be scanned in succession. With a flatbed scanning device, the medium 102 remains stationary, while a scanning mechanism is moved line by line over the medium 102 to scan the image on a line-by-line basis. With a sheet fed scanning device, the medium 102 is fed line by line so that the scanning mechanism scans the image on a line-by-line basis.

The logical lines 106 are exaggerated in size in FIG. 1 for illustrative clarity. In actuality, there may be 75, 150, 200, 300, or another number of lines per inch. Each of the lines 106 may be considered as having a like or a different number of pixels, such as 75, 150, 200, 300, or another number of pixels per inch. Because most scanning devices scan images on a line-by-line basis embodiments of the invention are described as such. However, other embodiments are amenable to scanning devices that scan images on a pixel-by-pixel basis, in a manner comparable to that how printhead-oriented printing devices, such as common inkjet printing devices, operate.

The lines 106 can further be logically grouped into a number of logical line groups 108A, 108B, ..., 108M, collectively referred to as the logical line groups 108. Each group includes more than one of the lines 106. The groups 108 are contiguous in that the lines of each group all border one or two other lines within the group. That is, the first and last lines of each group border just one other line within the group, whereas all the other lines of each group border two lines within the group. The number of lines within each group, and thus the number of groups 108, can vary depending on the embodiment of the invention.

Conventional scanning devices scan the image 104 on the hardcopy medium 102 to generate a digital color representation of the image 104 by scanning each of the lines 106 to detect color channel color space values for each line. A color space is a system for describing a set of colors numerically. A color channel color space is a color space that describes each color by values of the color channels of the color space. For example, the red-green-blue (RGB) color space includes red, green, and blue channels. Therefore, a color described in the RGB color space has a red value, a green value, and a blue value that together define the color. Another example of a color channel color space is the cyan-magenta-yellow (CMY) color spaces that includes cyan, magenta, and yellow channels, such that a color described in the CMY color space has a cyan value, a magenta value, and a yellow value that together define the color.

By comparison, another type of color space is a luminance-chrominance color space. A luminance-chrominance color space is a color space that describes each color by values of luminance and chrominance channels of the color space. For example, luminance-chrominance-chrominance (YCC) color space includes a luminance channel and two chrominance channels. Therefore, a color described in the YCC color space has a luminance value, and two chrominance values, that together define the color. Another example of a luminance-chrominance color space is the L*A*B* color space.

Therefore, a conventional scanning device scans the image 104 on the hardcopy medium 102 to generate a digital color representation of the image 104 by scanning each of the lines 106 to detect, for instance, red, green, and blue values for each line, in the typical case of the RGB color space. More specifically, a conventional scanning device scans each pixel of each line to directly detect the red, green, and blue values of each pixel of each line. As has been noted above, however, such scanning to detect red, green, and blue values of each line can lead to slow scanning performance, particularly where the red, green, and blue channels are separately scanned for each line, as is the case with contact image sensor (CIS)-based scanning devices. By comparison, embodiments of the invention generate a digital color representation of the image 104 on the hardcopy medium 102 without having to directly detect, or scan, all the color channel color space values for each pixel of each line of the image 104.

Figure 2:
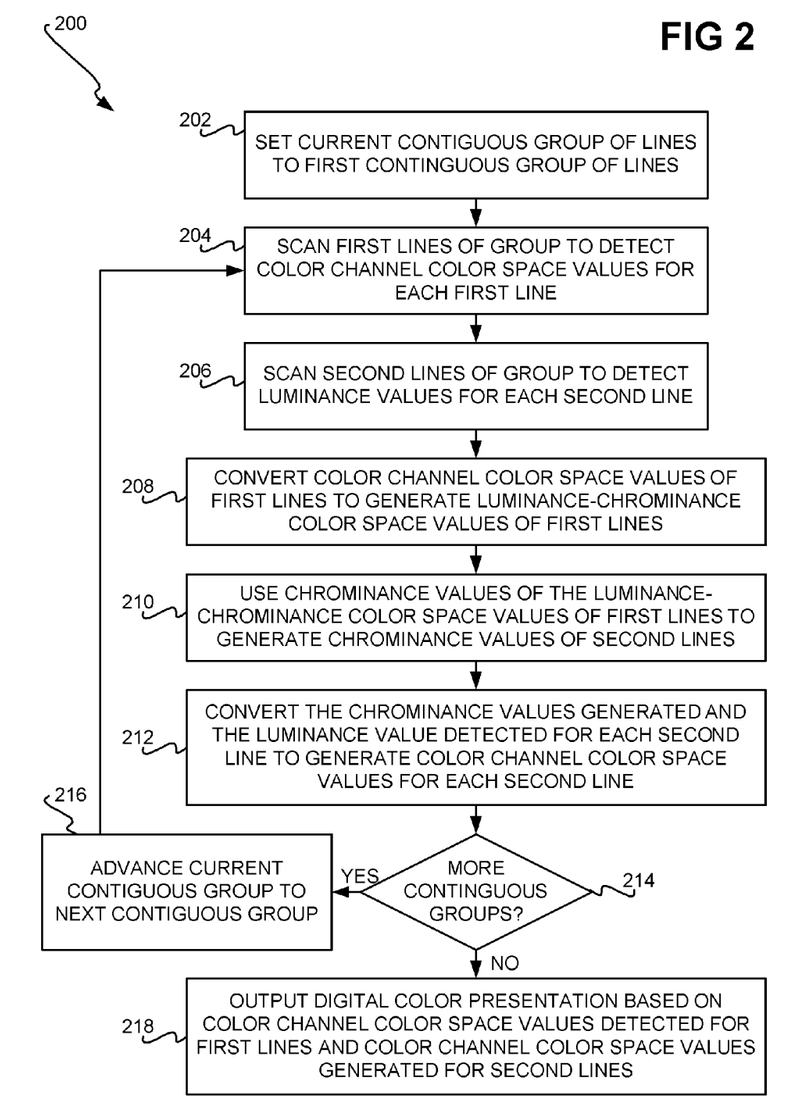
FIG. 2 is a flowchart of a method for generating a digital color representation of an image without having to directly detect, or scan, all the color channel color space values for each line of the image, according to an embodiment of the invention.

FIG. 2 shows a method 200 for generating a digital color representation of the hardcopy image 104 without having to directly detect all the color channel color space values for each line of the image 104, according to an embodiment of the invention. The method 200 may be performed by a scanning device. The various parts of the method 200 are depicted in and described in relation to FIG. 2 as being performed in a certain order. However, embodiments of the invention are not limited to the particular order shown in FIG. 2. For example, parts 208, 210, and 212 may be performed for each contiguous group of lines after the scanning of parts 204 and 206 has been performed for all the groups 108.

The method 200 begins by setting a current contiguous group of lines to the first contiguous group of lines (202). For example, the image 104 on the medium 102 may be scanned such that first the lines 106 within the group 108A are scanned, then the lines 106 within the group 108B are scanned, and so on, until the lines 106 within the group 108M are scanned. In this situation, the current contiguous group of lines is implicitly or explicitly set to the first contiguous group 108A of the lines 106.

Next, some of the lines of the current contiguous group, which are referred to herein as first lines, are particularly scanned to detect the color channel color space values for each such first line (204). For instance, for each pixel of each first line, the red, green, and blue values of the pixel may be detected. Alternatively, for each pixel of one of these first lines, just the red value may be detected; for each pixel of another of these first lines, just the green value may be detected; and, for each pixel of yet another of these first lines, just the blue value may be detected.

Other of the lines of the current contiguous group, which are referred to herein as second lines, are particularly scanned to detect the luminance values for each such second line (206). For instance, for each pixel of each second line, the luminance value of the pixel may be detected. The first lines and the second lines may be mutually exclusive, such that no first line is also a second line, and vice-versa. Alternatively, the first lines and the second lines may be coincident, such that at least one of the first lines is also a second line, and vice-versa.

When a scanning device is employed in parts 204 and 206 that is able to scan just a given color space color channel of a pixel at any given time, such as one that employs a CIS, parts 204 and 206 may be performed as follows. In part 204, the following is repeated for each of one or more different colors of the color channel color space. First, one or more light-generating units, such as light-emitting diodes (LED's), that output light of the color in question are turned on. Second, the color channel color space value for this color is then detected, as the light reflected by a given first line. For the RGB color space, for example, in one embodiment one red LED, or more than one red LED, may be turned on, and the red values detected for a given first line, then the red LED's turned off and one green LED, or more than one green LED, turned on so that the green values are detected, and finally the green LED's turned off and one blue LED, or more than one blue LED turned on to detect the blue values. That is, the differently colored LED's are successively turned on, and the reflected light detected as the corresponding color values.

By comparison, in part 206, such a scanning device can turn on all the differently colored LED's to yield white light. For example, in the RGB color space, turning on one or more of the red light-generating units, one or more of the green light-generating units, and one or more the blue light-generating units yields white light. For instance, 50% of the blue LED's, 100% of the red LED'S, and 70% of the green LED's may be turned on to yield white light. The reflection of this white light by a given second line is detected as the luminance values of the second line.

Figure 3A:
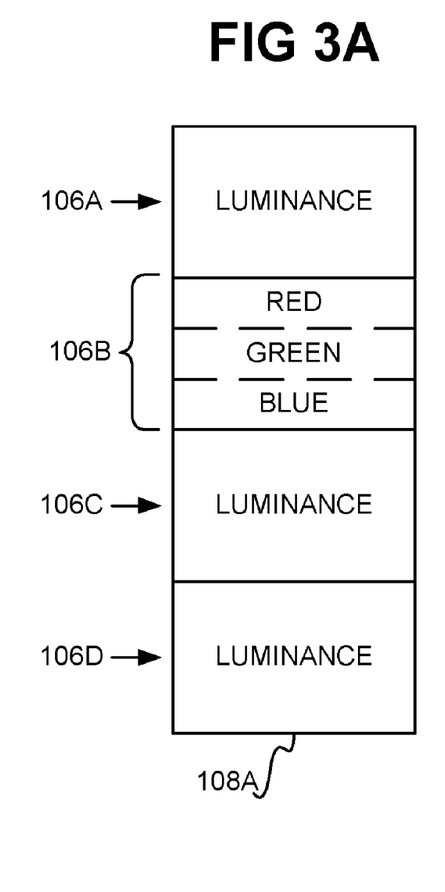
FIGS. 3A, 3B, and 3C are diagrams illustratively depicting performance of some parts of the method of FIG. 2 in relation to a contiguous group of logical lines into which a portion of a hardcopy image has been logically divided, according to an embodiment of the invention.

FIG. 3A shows exemplary performance of parts 204 and 206 of the method 200 in relation to the lines 106A, 106B, 106C, and 106D of the contiguous group 108A, according to an embodiment of the invention. The line 106B is considered as what is referred to herein as a first line. As such, the line 106B has red, green, and blue values directly detected for its pixels. By comparison, the lines 106A, 106C, and 106D are considered as what are referred to herein as second lines. As such, the lines 106A, 106C, and 106D just have luminance values directly detected for their pixels.

Referring back to FIG. 2, the color channel color spaces of the first lines are converted to a luminance-chrominance color space to generate luminance-chrominance color space values of the first lines (208). For example, the red, green, and blue RGB color space values of the first lines may be converted to luminance, chrominance, and chrominance YCC color space values. Therefore, after conversion, each first line is thus represented by three YCC color space values, specifically one luminance value and two chrominance values. Conversion of a given color represented in one color space, such as a color channel color space, to representation in another color space, such as a luminance-chrominance color space, is known within the art.

Next, the chrominance values of the luminance-chrominance color space values of the first lines are employed to generate chrominance values of the second lines (210). Because each second line has just had its luminance values directly detected, to fully describe each second line in a luminance-chrominance (or other) color space, each second line also has to be assigned chrominance values. In one embodiment, these chrominance values for each second line are simply determined as equal to the chrominance values of the first line or first lines within the same contiguous group. In another embodiment, the chrominance values for each second line may be determined in a more sophisticated manner, by interpolating the chrominance values of the first line or first lines.

Figure 3B:
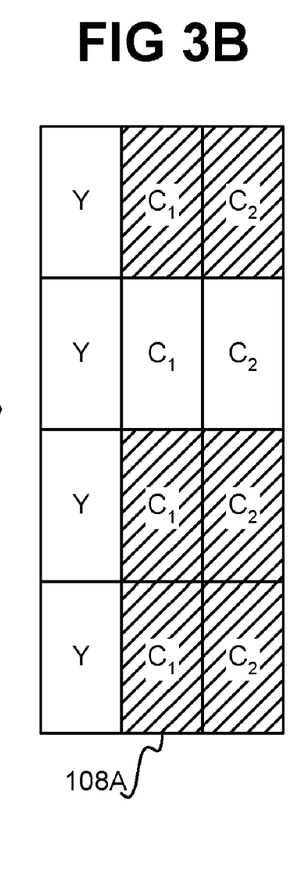

FIG. 3B shows exemplary performance of parts 208 and 210 of the method 200 in relation to the lines 106A, 106B, 106C, and 106D of the contiguous group 108A, according to an embodiment of the invention. In part 206, the directly detected, or scanned, red, green, and blue values of each of the pixels of the first line 106B are converted to luminance (Y), chrominance ($C_1$), and chrominance ($C_2$) values. These values are indicated in FIG. 3B without shading to denote that they are based on directly detected, or scanned, values for the same line in question. The second lines 106A, 106C, and 106D already have had luminance (Y) values directly detected, or scanned, for each of their pixels. These values are also indicated in FIG. 3B without shading to denote that they are directly detected, or same values, for the same lines in question.

In part 208, the chrominance ($C_1$) and chrominance ($C_2$) values for the pixels of the second lines 106A, 106C, and 106D are generated by using the chrominance ($C_1$) and chrominance ($C_2$) values for the first line 106B. In one embodiment, the chrominance ($C_1$) and chrominance ($C_2$) values for each of the pixels of each of second lines 106A, 106C, and 106D can be simply copied such that they are equal to the chrominance ($C_1$) and chrominance ($C_2$) values for the corresponding pixel within the first line 106B. In another embodiment, however, the chrominance ($C_1$) and chrominance ($C_2$) values for the second lines 106A, 106C, and 106D may be generated based on the chrominance ($C_1$) and chrominance ($C_2$) values for the first line 106B in some manner other than direct copying on a pixel-by-pixel basis, such as by some form of interpolation, for instance.

Referring back to FIG. 2, since each of the second lines now has its colors completely described in accordance with a luminance-chrominance color space, the chrominance values (as generated) and the luminance values (as detected) for the second lines are converted to generate color channel color space values for each second line (212). For example, each second line may now be represented by three YCC color space values, specifically one luminance value and two chrominance values. Therefore, these luminance, chrominance, and chrominance YCC color space values may be converted to red, green, and blue RGB color space values. Therefore, after conversion, each second line is represented by three RGB color space values, specifically a red value, a green value, and a blue value for each pixel of each second line.

Figure 3C:
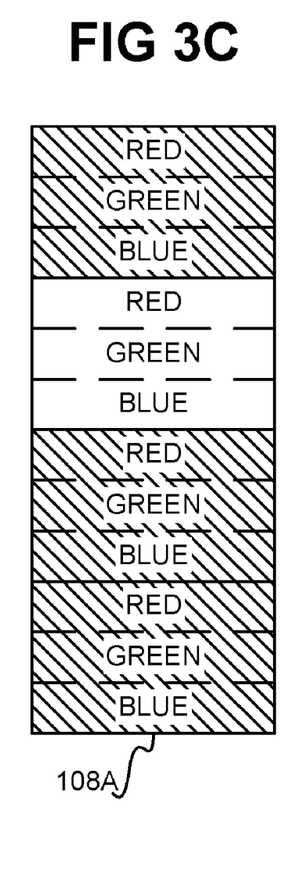

FIG. 3C shows exemplary performance of part 212 of the method 200 in relation to the lines 106A, 106B, 106C, and 106D of the contiguous group 108A, according to an embodiment of the invention. As in FIG. 3A, the first line 106B has already had red, green, and blue values directly detected for its pixels. Therefore, these values are not shaded in FIG. 3C to denote that they are directly detected, or scanned, values. In part 212, the directly detected luminance (Y) value, and the generated chrominance ($C_1$) and chrominance ($C_2$) values for each pixel of each of the second lines 106A, 106C, and 106D are converted to red, green, and blue values. Therefore, these values are shaded in FIG. 3C to denote that they are not directly detected, or scanned, values.

The end result of performing parts 204 and 206 of the method 200 of FIG. 2, as illustratively exemplified in FIG. 3A; parts 208 and 210 of the method 200, as illustratively exemplified in FIG. 3B; and, part 212, as illustratively exemplified in FIG. 3C, is that all the lines 106 of the contiguous group 108A have color channel color space values for their pixels. However, the color channel color space values were actually detected for the pixels of just one of these lines, the first line 106B. The color channel color space values were instead generated for the pixels of the second lines 106A, 106C, and 106D, based on their directly detected luminance values, and on their chrominance values as generated from the chrominance values of the corresponding pixels of the first line 106B.

Scanning a digital color representation of the lines 106 within the contiguous group 108A is thus performed more quickly utilizing the approach of FIG. 2 than if color channel color spaces for all the lines 106 were directly detected or scanned as is conventional. For example, it may take time Y to scan the red, green, blue, or luminance values of a given line, and it may take time X to advance from the current line to the next line. Therefore, conventionally scanning color channel color space values for all the lines 106 within the contiguous group 108A may take 4(X+3Y), or 4X+12Y, because each of four lines has to be advanced to, and three color channel color space values may have to be read for each of these four lines.

By comparison, scanning the lines 106 within the contiguous group 108A in accordance with the method 200 of FIG. 2 may take 4X+3Y+3Y, or 4X+6Y, since each of the four lines still has to be advanced to, but the three color channel color space values have to be read for just one first line, and just a single luminance value has to be read for each of three lines. Therefore, scanning the lines 106 within the group 108A in accordance with the method 200 as compared to as is conventional can take (4X+12Y)−(4X+6Y), or 6Y, less time, where the specific embodiment of FIGS. 3A, 3B, and 3C is employed. In general, it can be said that scanning a digital color representation is achieved more quickly by using an embodiment of the invention, in which one or more of the color channel color space values are generated without direct detection or scanning, as compared to directly detecting or scanning all the color channel color space values as is conventional.

Referring back to FIG. 2, if after performing part 212 of the method 200 for the current contiguous group there are additional contiguous groups of logical lines that still have to be scanned (214), then the current contiguous group is advanced to the next contiguous group (216), and the method 200 repeats parts 204, 206, 208, 210, and 212 for this new contiguous group. Once all the contiguous groups have been processed by performing parts 204, 206, 208, 210, and 212 (214), then the method 200 outputs a digital color representation of the hardcopy image 104 that has been resultantly scanned (218). It can be said that this digital color representation is based on the color channel color space values that have been directly detected, or scanned, for the first lines, and on the color channel color space values that have been generated for the second lines, as has been exemplarily described in relation to FIG. 3C.

The outputting of the digital color representation in part 218 of the method 200 can take one of many different forms. As one example, the data of this digital color representation may be stored on a storage device, emailed or otherwise transmitted or communicated by the scanning device, and so on. As another example, the digital color representation may be printed on another hardcopy medium by a printing device, to achieve digital-photocopying functionality. Other types of output of the digital color representation may be also be performed, as can be appreciated by those of ordinary skill within the art.

The exemplary performance of the method 200 of FIG. 2 that has been described in relation to FIGS. 3A, 3B, and 3C is such that what has been referred to as the first lines are mutually exclusive with what have been referred to as the second lines. That is, the first line 106B is not a second line, and none of the second lines 106A, 106B, and 106C is a first line. Furthermore, in FIGS. 3A, 3B, and 3C, values for all of the color channels of the color space in question, the RGB color space, have been directly detected for all of the first lines. That is, a red value, a green value, and a blue value have been directly detected for the single first line 106B.

Figure 4A:
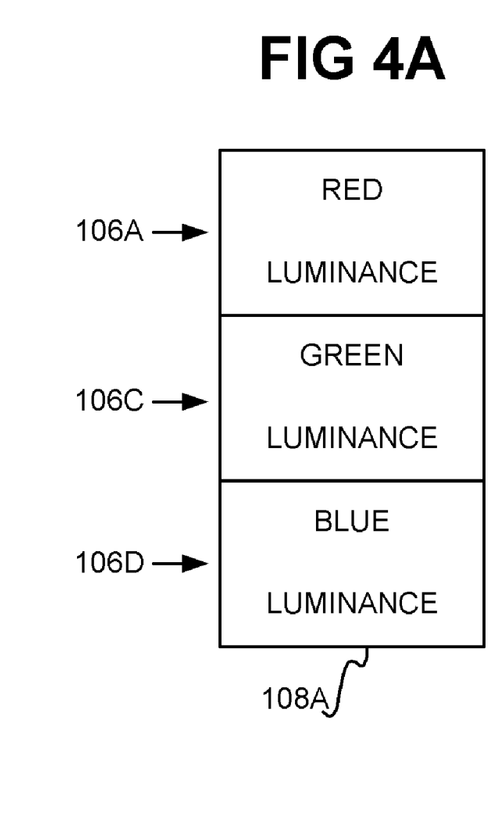
FIGS. 4A, 4B, and 4C are diagrams illustratively depicting performance of some parts of the method of FIG. 2 in relation to a contiguous group of logical lines into which a portion of a hardcopy image has been logically divided, according to another embodiment of the invention.
Figure 4B:
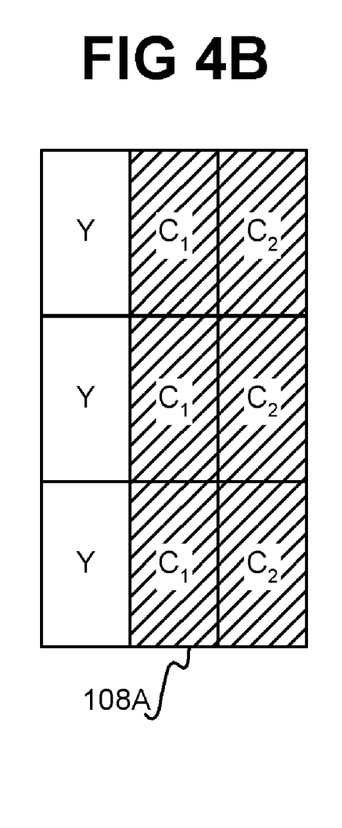
Figure 4C:
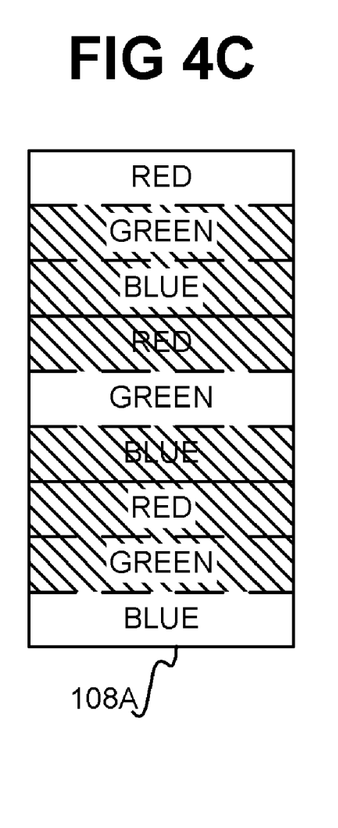

By comparison, FIGS. 4A, 4B, and 4C illustrate exemplary performance of the method 200 of FIG. 2, according to a different embodiment of the invention. In the exemplary performance of the method 200 depicted in FIGS. 4A, 4B, and 4C, the first lines are not mutually exclusive with the second lines. Furthermore, the values for all of the color channels of the color space in question, the RGB color space, are not directly detected for all of the first lines. In FIGS. 4A, 4B, and 4C, the representative contiguous group 108A of the logical lines 106 is considered to be made up of just three lines, the lines 106A, 106B, and 106C.

In FIG. 4A, part 204 of the method 200 is performed in relation to all the lines 106A, 106B, and 106C of the group 108A as the first lines to directly detect, or scan, color channel color space values for the pixels of these lines. However, just a value for the red color channel of the RGB color space is directly detected, or scanned, for each pixel of the line 106A. Similarly, just a value for the green color channel of the RGB color space is directly detected, or scanned, for each pixel of the line 106B, and just a value for the blue color channel of the RGB color space is directly detected, or scanned, for each pixel of the line 106C. Also in FIG. 4A, part 206 of the method 200 is performed in relation to all the lines 106A, 106B, and 106C of the group 108A as the second lines to directly detect, or scan, luminance values are directly detected for each pixel of each of the lines 106A, 106B, and 106C.

In FIG. 4B, the luminance ("Y") values for each pixel of each of the lines 106A, 106B, and 106C are those that have been directly detected, or scanned, such that they are indicated without shading. Parts 208 and 210 of the method 200 are performed to generate the chrominance ("$C_1$" and "$C_2$") values for each pixel of each of the lines 106A, 106B, and 106C as both the first and the second lines in this exemplary embodiment of the invention, such that they are indicated with shading in FIG. 4B. Particularly, the chrominance $C_1$ values for the corresponding pixels of all of the lines 106A, 106B, and 106C are equal to one another, and are generated from the red values of the corresponding pixels of the line 106A, the green values of the corresponding pixels of the line 106B, and the blue values of the corresponding pixels of the line 106C. Likewise, the chrominance $C_2$ values for the corresponding pixels of all of the lines 106A, 106B, and 106C are equal to one another, and are generated from the red values of the corresponding pixels of the line 106A, the green values of the corresponding pixels of the line 106B, and the blue values of the corresponding pixels of the line 106C.

In FIG. 4C, part 212 of the method 200 is performed in relation to all the lines 106A, 106B, and 106C of the group 108A as the second lines to generate two of the red, green, and blue values for each of the pixels of the lines 106A, 106B, and 106C. For the pixels of the line 106A, the value for the red color channel of the RGB color space has been directly detected, or scanned, as in FIG. 4A, and is thus not shaded in FIG. 4C. By comparison, the green and blue values for the pixels of the line 106A are generated from the luminance and chrominance values of FIG. 4B, and thus are shaded in FIG. 4C. Likewise, for the pixels of the line 106B, the green value has been directly detected, or scanned, as in FIG. 4A, and is not shaded in FIG. 4C, whereas the red and blue values are generated from the luminance and chrominance values of FIG. 4B, and are shaded in FIG. 4C. Similarly, for the pixels of the line 106C, the blue value has been directly detected, or scanned, as in FIG. 4A, and is not shaded in FIG. 4C, whereas the red and green values are generated from the luminance and chrominance values of FIG. 4B, and are shaded in FIG. 4C.

Figure 5:
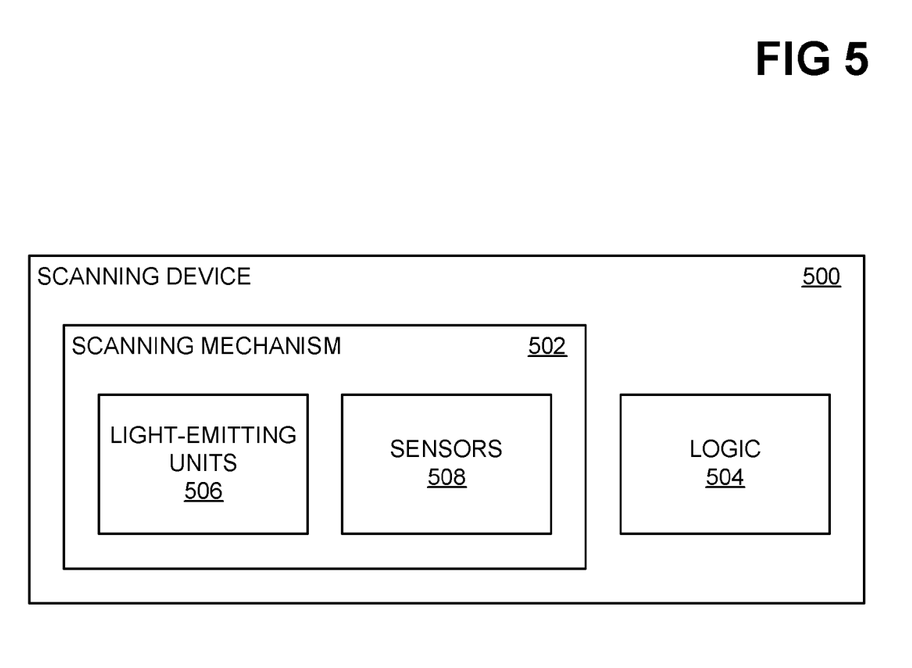
FIG. 5 is a rudimentary diagram of a representative scanning device, according to an embodiment of the invention.

FIG. 5 is a rudimentary block diagram of a representative scanning device 500, according to an embodiment of the invention. The scanning device 500 includes a scanning mechanism 502 and logic 504. The scanning device 500 may be a standalone scanning device, which is also referred to as a scanner, or a device that combines scanning functionality with other functionality, such as printing and/or faxing functionality, and which is also referred to as an "all-in-one" (AIO) device. As can be appreciated by those of ordinary skill within the art, the scanning device 500 can and typically will include other components, besides those indicated in FIG. 5.

The scanning mechanism 502 may be a flatbed scanning mechanism, a sheet fed scanning mechanism, or another type of scanning mechanism. The scanning mechanism 502 includes those components that enable one or more lines of the hardcopy image 104 to be detected, or scanned, at a given time. The scanning mechanism 502 includes one or more light-emitting units 506 and one or more sensors 508. The scanning mechanism 502 may further include other components, besides those indicated in FIG. 5. The light-emitting units 506 are capable of emitting white light, as well as light having colors corresponding to other colors. For example, the units 506 may be able to emit red, green, and blue light, corresponding to the red, green, and blue color channels of the RGB color space.

The sensors 508 may each be a CIS, a charge-coupled device (CCD), or another type of sensor that detects the light emitted by the light-emitting units 506 as reflected by the hardcopy image 104. For example, in the former situation, the scanning mechanism 502 works as follows in one embodiment. If given color values (e.g., red color values) are to be detected, or scanned, for a given line, the light-emitting units 506 operate to output correspondingly colored light, and the sensors 508 detect this light as reflected by the given line as the given color values for this line. If luminance values are to be detected, or scanned, for a given line, the light-emitting units 506 operate to output white light, and the sensors 508 detect this light as reflected by the given line as the luminance values for this line.

The logic 504 may be implemented in hardware, software, or a combination of hardware and software. The logic 504 controls the scanning mechanism 502 in accordance with an embodiment of the invention. For example, generally, the logic 504 controls the scanning mechanism 502 such that a digital color representation of the hardcopy image 104 is generated that has color channel color space values for each of the logical lines 106, without directly detecting, or scanning, all the color channel color space values for each line. Thus, the logic 504 can perform and/or cause the scanning mechanism 502 to perform the method 200 of FIG. 2, as exemplified by FIGS. 3A, 3B, 3C, by FIGS. 4A, 4B, and 4C, or by another embodiment of the invention.

We claim:
1. A method for scanning a hardcopy image in color, comprising:
   for each contiguous sub-plurality of a plurality of logical lines of the image,
     scanning one or more first lines of the contiguous sub-plurality to detect one or more color channel color space values for each first line;
     scanning one or more second lines of the contiguous sub-plurality to detect luminance values for each second line;
     converting the color channel color space values of the first lines to generate luminance-chrominance color space values of the first lines;
     using chrominance values of the luminance-chrominance color space values of the first lines to generate chrominance values of the second lines; and,
     converting the chrominance values generated and the luminance values detected for each second line to generate one or more color channel color space values for the second line.

2. The method of claim 1, further comprising outputting a digital color representation of the image based on the color channel color space values detected for the first lines and the color channel color space values generated for the second lines.

3. The method of claim 1, wherein scanning the first lines of the contiguous sub-plurality to detect the color channel color space values for each first line comprises, where the color channel color space is made up of a plurality of different colors, detecting a color channel color space value for the first line for each different color.

4. The method of claim 3, wherein detecting the color channel color space value for the first line for each different color comprises, where the color channel color space is made up of red, green, and blue colors, detecting a red value, a green value, and a blue value for the first line.

5. The method of claim 1, wherein scanning the first lines of the contiguous sub-plurality to detect the color channel color space values for each first line comprises, where the color channel color space is made up of a plurality of different colors, detecting a color channel color space value for the first line for each of a sub-plurality of the plurality of different colors,
such that for each different color, the color channel color space value for at least one of the first lines is detected for the different color.

6. The method of claim 5, wherein detecting the color channel color space value for the first line for each of a sub-plurality of the plurality of different colors comprises, where the color channel color space is made up of red, green, and blue colors, detecting at least one, but not all, of a red value, a green value, and a blue value for the first line.

7. The method of claim 1, wherein scanning the first lines of the contiguous sub-plurality to detect the color channel color space values for each first line comprises:
repeating for each of one or more different colors of the color channel color space,
turning on light having a color corresponding to the different color; and,
detecting the color channel color space value for the different color for the first line as the light reflected by the first line.

8. The method of claim 7, wherein scanning the second lines of the contiguous sub-plurality to detect the luminance values for each second line comprises:
turning on light corresponding to all different colors of the color channel color space, such that the light is white light; and,
detecting the luminance values for the second line as the light reflected by the second line.

9. The method of claim 1, wherein the first lines and the second lines of each contiguous sub-plurality of the plurality of logical lines of the image are mutually exclusive, such that no first line is also a second line and vice-versa.

10. The method of claim 1, wherein the first lines and the second lines of each contiguous sub-plurality of the plurality of logical lines of the image are coincident, such that at least one first line is also a second line and vice-versa.

11. The method of claim 1, wherein the color channel color space values detected for the first lines and generated for the second lines comprise one of:
red, green, and blue color channel red-green-blue (RGB) color space values; and,
cyan, magenta, and yellow color channel cyan-magenta-yellow (CMY) color space values.

12. The method of claim 1, wherein the luminance-chrominance color space values comprise luminance, chrominance, and chrominance color channel luminance-chrominance-chrominance (YCC) color space values.

13. A scanning device comprising:
a scanning mechanism; and,
logic to control the scanning mechanism such that a digital color representation of a hardcopy image is generated having color channel color space values for each of a plurality of logical lines of the image without directly detecting all the color channel color space values for each line of the image wherein, for each contiguous sub-plurality of lines, the logic is to: convert the color channel color space values of the first lines to generate luminance-chrominance color space values of the first lines, use chrominance values of the luminance-chrominance color space values of the first lines to generate chrominance values of the second lines, and convert the chrominance values generated and the luminance values detected for each second line to generate one or more color channel color space values for the second line.

14. The scanning device of claim 13, wherein, for each contiguous sub-plurality of lines, the logic is to:
convert the color channel color space values of the first lines to generate luminance-chrominance color space values of the first lines,
use chrominance values of the luminance-chrominance color space values of the first lines to generate chrominance values of the second lines, and
convert the chrominance values generated and the luminance values detected for each second line to generate one or more color channel color space values for the second line.

15. The scanning device of claim 13, wherein the scanning mechanism comprises:
one or more light-generating units capable of outputting color light in each of a plurality of different colors of the color channel color space, and of outputting white light corresponding to all of the plurality of different colors of the color space in unison; and,
one or more sensors to detect the color light or the white light as reflected by one or more current lines of the image.

16. The scanning device of claim 15, wherein, for each contiguous sub-plurality, the logic is to:
control the scanning mechanism to detect the color channel color space values for each first line of the contiguous sub-plurality by directing the light-generating units to successively output the color light in each of one or more of the different colors of the color channel color space, and by reading the color channel color space values as the color light reflected by the first line as correspondingly detected by the sensors, and
control the scanning mechanism to detect the luminance values for each second line of the contiguous sub-plurality by directing the light-generating units to output the white light, and by reading the luminance values as the white light reflected by the second line as correspondingly detected by the sensors.

17. The scanning device of claim 13, wherein the first lines and the second lines of each contiguous sub-plurality of the plurality of logical lines of the image are mutually exclusive, such that no first line is also a second line and vice-versa.

18. The scanning device of claim 13, wherein the first lines and the second lines of each contiguous sub-plurality of the plurality of logical lines of the image are coincident, such that at least one first line is also a second line and vice-versa.

19. A scanning device comprising:

first means for scanning a hardcopy image; and, second means for controlling the first means, such that a digital color representation of a hardcopy image is generated having color channel color space values for each of a plurality of logical lines of the image without directly detecting all the color channel color space values for each line of the image, wherein the plurality of lines of the image is divided into contiguous sub-pluralities, such that for each contiguous sub-plurality, the second means is to control the first means to detect one or more color channel color space values for each of one or more first lines of the contiguous sub-plurality, and the second means is to control the first means to detect luminance values for each of one or more second lines of the contiguous sub-plurality without detecting all individual color channel color space values for each second line.

* * * * *